US012787924B2

(12) United States Patent
Nishii et al.

(10) Patent No.: US 12,787,924 B2
(45) Date of Patent: Nov. 10, 2026

(54) COMBINE AND TRAVEL CONTROL METHOD

(71) Applicant: Yanmar Holdings Co., Ltd., Osaka (JP)

(72) Inventors: Yasuto Nishii, Osaka (JP); Masaaki Murayama, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 578 days.

(21) Appl. No.: 18/039,713

(22) PCT Filed: Oct. 27, 2021

(86) PCT No.: PCT/JP2021/039596
§ 371 (c)(1),
(2) Date: May 31, 2023

(87) PCT Pub. No.: WO2022/118566
PCT Pub. Date: Jun. 9, 2022

(65) Prior Publication Data

US 2024/0016087 A1 Jan. 18, 2024

(30) Foreign Application Priority Data

Dec. 2, 2020 (JP) ................................ 2020-200119

(51) Int. Cl.
*A01D 41/127* (2006.01)

(52) U.S. Cl.
CPC ................................ *A01D 41/127* (2013.01)

(58) Field of Classification Search
CPC .............. A01D 41/127; A01D 41/1271; A01D 41/1272; A01D 41/1274; A01D 41/1278;
(Continued)

(56) References Cited

U.S. PATENT DOCUMENTS

2016/0302360 A1 10/2016 Depestel et al.
2017/0177002 A1* 6/2017 Ogura .................. G05D 1/0278
(Continued)

FOREIGN PATENT DOCUMENTS

EP 0713639 A1 9/1995
EP 3847878 A1 10/2020
(Continued)

OTHER PUBLICATIONS

Japanese Office Action dated Mar. 12, 2024, issued in JP Application No. 2020-200119.
(Continued)

*Primary Examiner* — Robert E Pezzuto
(74) *Attorney, Agent, or Firm* — NORTON ROSE FULBRIGHT US LLP

(57) ABSTRACT

This combine is provided with: a body part including a mowing part for mowing grain culms; a travel part for supporting the body part and traveling; a detection part for detecting an abnormality in the body part; and a control part which executes automatic mowing work for causing the mowing part to mow grain culms while causing the travel part to autonomously travel and carries out control such that, when the detection part detects an abnormality during the automatic mowing work, the automatic mowing work is interrupted and subsequently the travel part is made to travel backward by a first predetermined distance.

15 Claims, 14 Drawing Sheets

(58) Field of Classification Search
CPC .. A01B 69/008; A01B 79/005; G05D 1/0278; G05D 1/005; G05D 1/0055; G05D 1/0212
See application file for complete search history.

(56) References Cited

U.S. PATENT DOCUMENTS

| | | | | |
|---|---|---|---|---|
| 2018/0168100 | A1* | 6/2018 | Ueda | A01D 41/12 |
| 2020/0367434 | A1* | 11/2020 | Nakabayashi | A01D 41/1278 |

FOREIGN PATENT DOCUMENTS

| | | | |
|---|---|---|---|
| JP | 63-240707 | A | 10/1988 |
| JP | 2000-029520 | A | 1/2000 |
| JP | 2001-042936 | A | 2/2001 |
| JP | 2001-061322 | A | 3/2001 |
| JP | 3250106 | B2 | 1/2002 |
| JP | 2015-170223 | A | 9/2015 |
| JP | 2017-176008 | A | 10/2017 |
| JP | 2018-045709 | A | 3/2018 |
| JP | 2019-097397 | A | 6/2019 |
| JP | 2019-216744 | A | 12/2019 |
| WO | 2020100810 | A1 | 5/2020 |

OTHER PUBLICATIONS

Extended European Search Report dated Oct. 7, 2024, issued in EP Application No. 21900321.7.
International Search Report dated 2022-01-18 issued in corresponding PCT Application PCT/JP2021/039596.

* cited by examiner

COMBINE AND TRAVEL CONTROL METHOD

CROSS-REFERENCE TO RELATED APPLICATIONS

This application is a national stage application pursuant to 35 U.S.C. § 371 of International Application No. PCT/JP2021/039596, filed on Oct. 27, 2021, which claims priority under 35 U.S.C. § 119 to Japanese Patent Application No. 2020-200119 filed on Dec. 2, 2020, the disclosures of which are hereby incorporated by reference in their entireties.

TECHNICAL FIELD

The present invention relates to a combine harvester that reaps grain culms and a travel control method.

BACKGROUND ART

Conventionally, an art for improving working efficiency of a combine harvester has been examined. For example, Patent Literature 1 proposes a change of a height position of a reaping portion on the basis of information on a travel route set in advance and information on a field end, position information acquired by using GPS, and information on an inclination angle detected by a gyro sensor. In Patent Literature 2, it is proposed that a harvested amount of grains stored in a tank is detected, a yield per unit travel distance of harvested grains is detected, a position on a straight travel route at which the tank is brought into a full state is predicted, and, at a turning position immediately before the predicted position, the reaping work is interrupted, and autonomous travel is performed to a position capable of discharge. In Patent Literature 3, it is proposed that a travel course of the combine harvester is generated so that crops are harvested spirally from an outer peripheral side to an inner side in a work area, and the combine harvester is caused to travel along the generated travel course to cause the combine harvester to perform harvesting of the crops.

CITATION LIST

Patent Literature

Patent Literature 1: Japanese Patent Application Publication No. 2017-176008

Patent Literature 2: Japanese Patent Application Publication No. 2019-216744

Patent Literature 3: Japanese Patent Application Publication No. 2015-170223

DISCLOSURE OF INVENTION

Problems to be Solved by the Invention

However, Patent Literatures 1 to 3 do not describe how to respond when an abnormality occurs in the combine harvester during an automatic reaping work.

Considering the above circumstances, it is an object of the present invention to provide a combine harvester and a travel control method that can facilitate a work for solving an abnormality when an abnormality occurs in the combine reaping during the automatic reaping work.

Means for Solving the Problems

In order to solve the above problem, a combine harvester according to the present invention is characterized by including a main-body portion including a reaping portion which reaps grain culms, a traveling portion which travels while supporting the main-body portion, a detecting portion which detects an abnormality in the main-body portion, and a control portion which executes control such that, when the detecting portion detects an abnormality during performance of an automatic reaping work in which the reaping portion is caused to reap the grain culms while the traveling portion is caused to travel autonomously, after the automatic reaping work is interrupted, the traveling portion is caused to travel backward by a first predetermined distance.

The detecting portion detects an abnormality in the main-body portion and a sign of an abnormality in the main-body portion, and when the detecting portion detects a sign of an abnormality during performance of the automatic reaping work, the control portion executes control such that, after the automatic reaping work is interrupted, the control portion causes the traveling portion to travel backward by the first predetermined distance.

The combine harvester includes a field-information acquiring portion which acquires field information including an outer shape of a field and an outer shape of an unreaped land or a reaped land in the field, and when the field information indicates that either one of left and right of the main-body portion is the unreaped land and the other side is the reaped land, and when the detecting portion detects an abnormality or a sign of an abnormality during performance of the automatic reaping work, the control portion may execute control such that the traveling portion is caused to travel backward by the first predetermined distance and to travel away from the unreaped land to a side by a second predetermined distance.

The control portion may execute control such that, when the detecting portion detects an abnormality or a sign of an abnormality in a part of the unreaped land side of the main-body portion, the traveling portion is caused to travel backward by the first predetermined distance and to travel away from the unreaped land to the side by the second predetermined distance.

The combine harvester includes a conveying device which conveys the grain culms reaped by the reaping portion and a threshing portion which threshes the grain culms conveyed by the conveying device, on the left side of the main-body portion, and the control portion may execute control such that, when the field information indicates that the left of the main-body portion is the unreaped land and the right is the reaped land, and when the detecting portion detects an abnormality or a sign of an abnormality in the conveying device or the threshing portion, the traveling portion is caused to travel backward by the first predetermined distance and to travel away from the unreaped land to the right by the second predetermined distance.

The combine harvester includes an operation portion which accepts operations, and the control portion may execute control such that, after the traveling portion is caused to travel backward, when an abnormality or a sign of an abnormality detected by the detecting portion is solved, and when an operation which allows resumption of the automatic reaping work is accepted by the operation portion, after movement to an interrupted position where the automatic reaping work was interrupted, the traveling portion and the main-body portion resume the automatic reaping work.

The control portion may control the traveling portion such that the traveling portion moves to the interrupted position at a speed slower than a set speed in the automatic reaping work.

The combine harvester includes the operation portion which accepts operations, and the control portion may execute control such that, after the automatic reaping work is interrupted, when the operation which allows the traveling portion to travel backward is accepted by the operation portion, the traveling portion is caused to travel backward.

A travel control method according to the present invention is characterized by including an automatic reaping process in which a reaping portion is caused to perform an automatic reaping work for reaping grain culms, while a traveling portion is caused to travel autonomously while supporting a main-body portion including the reaping portion and a backward control process in which, when a detecting portion detects an abnormality of the main-body portion during performance of the automatic reaping work, after the automatic reaping work is interrupted, the traveling portion is controlled to travel backward by a first predetermined distance.

In the backward control process, when the detecting portion detects a sign of an abnormality in the main-body portion during performance of the automatic reaping work, it may be controlled such that, after the automatic reaping work is interrupted, it may be controlled such that the traveling portion is caused to travel backward by the first predetermined distance.

In the backward control process, when the field information indicates that either one of the left and right of the main-body portion is the unreaped land and the other is the reaped land, and when the detecting portion detects an abnormality or a sign of an abnormality during performance of the automatic reaping work, it may be controlled such that the traveling portion is caused to travel backward by the first predetermined distance and to travel away from the unreaped land to a side by the second predetermined distance.

In the backward control process, when the detecting portion detects an abnormality or a sign of an abnormality in a part of the unreaped land side of the main-body portion, it may be controlled such that the traveling portion is caused to travel backward by the first predetermined distance and to travel away from the unreaped land to a side by the second predetermined distance.

In the backward control process, when the field information indicates that the left of the main-body portion is the unreaped land and the right of the main-body portion is the reaped land, and when the detecting portion detects an abnormality or a sign of an abnormality in a conveying device which is provided on the left side of the main-body portion and conveys the grain culms reaped by the reaping portion, or the threshing portion which is provided on the left side of the main-body portion and threshes the grain culms conveyed by the conveying device, it may be controlled such that the traveling portion is caused to travel backward by the first predetermined distance and to travel away from the unreaped land to the right by the second predetermined distance.

The travel control method may include an automatic-reaping resumption process in which, after the traveling portion is caused to travel backward in the backward control process, when an abnormality or a sign of an abnormality detected by the detecting portion is solved and an operation which allows the automatic reaping work to be resumed is accepted by the operation portion, the traveling portion and the main-body portion are controlled such that, after the movement to an interrupted position where the automatic reaping work was interrupted, the traveling portion and the main-body portion resume the automatic reaping work.

In the automatic-reaping resumption process, the traveling portion may be controlled to move to the interrupted position at a speed slower than a set speed in the automatic reaping work.

In the backward control process, after the automatic reaping work is interrupted, when an operation which allows the traveling portion to travel backward is accepted by the operation portion, the traveling portion may be controlled to travel backward.

Effect of the Invention

According to the present invention, if an abnormality occurs in the combine harvester during the automatic reaping work, a work to solve the abnormality can be performed easily.

DESCRIPTION OF EMBODIMENTS

Hereinafter, a combine harvester 1 according to an embodiment of the present invention will be explained with reference to the drawings.

Figure 1:
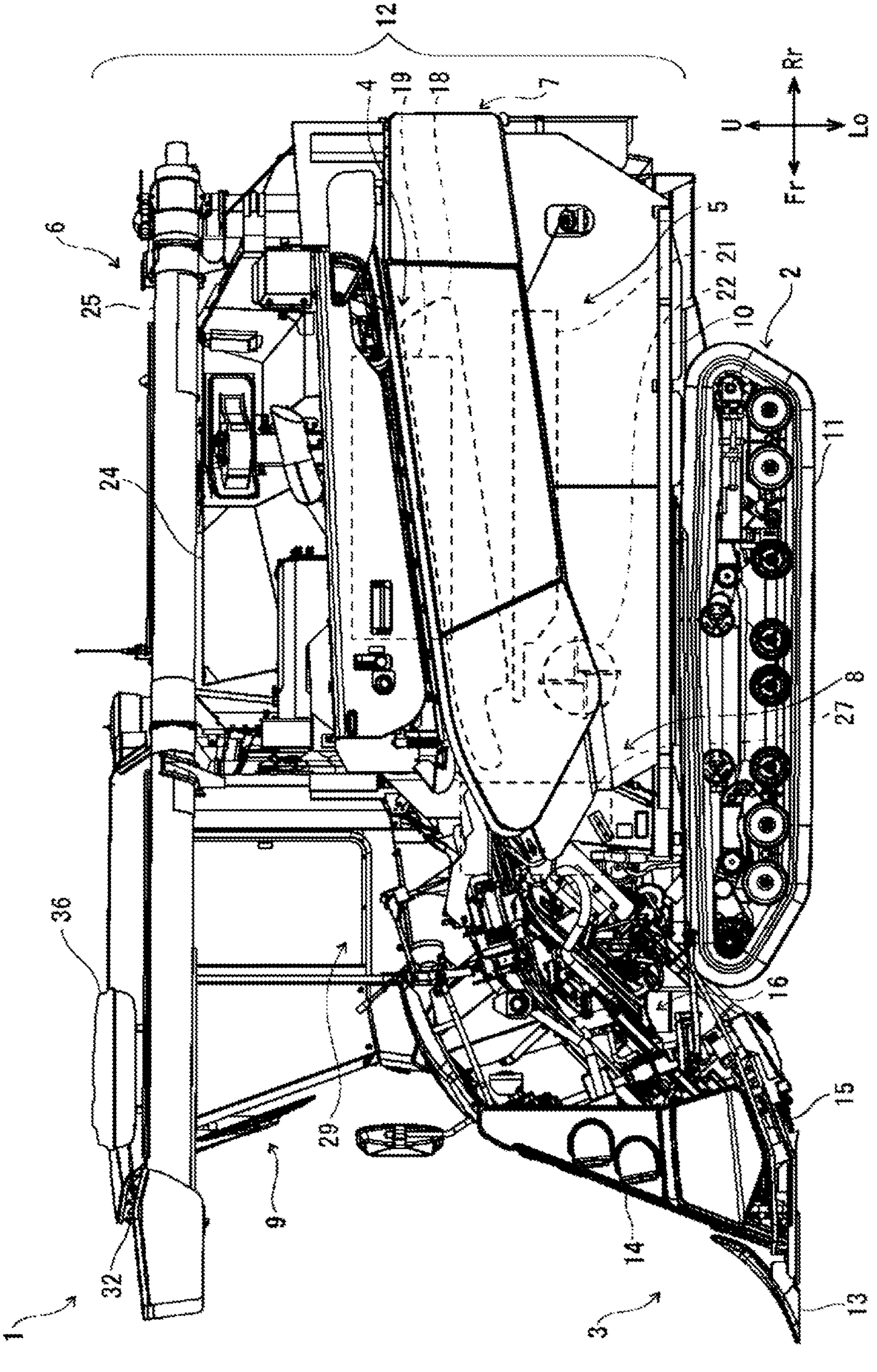
FIG. 1 is a left side view of a combine harvester according to an embodiment of the present invention.
Figure 2:
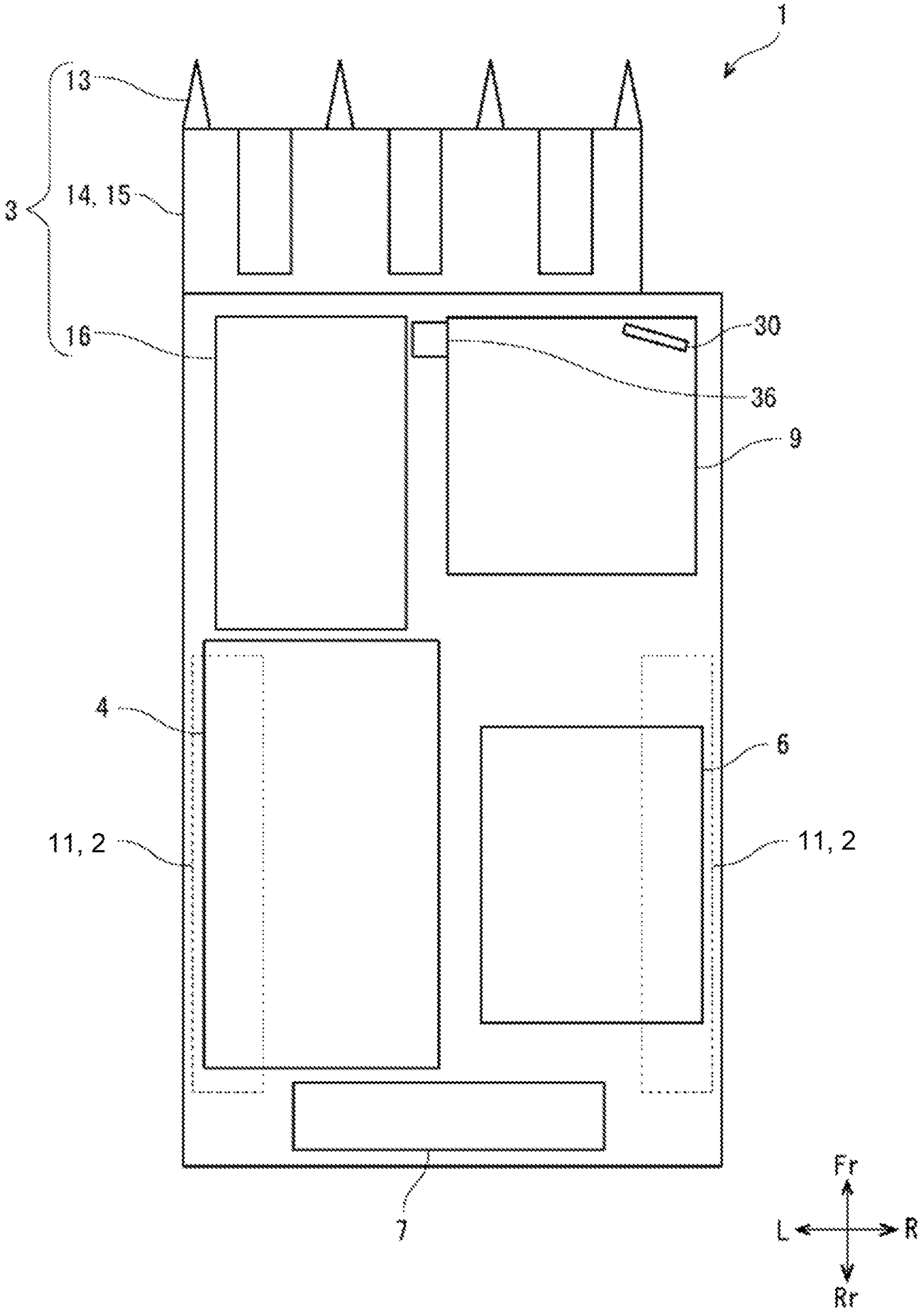
FIG. 2 is a plan view schematically illustrating a configuration of the combine harvester according to the embodiment of the present invention.
Figure 3:
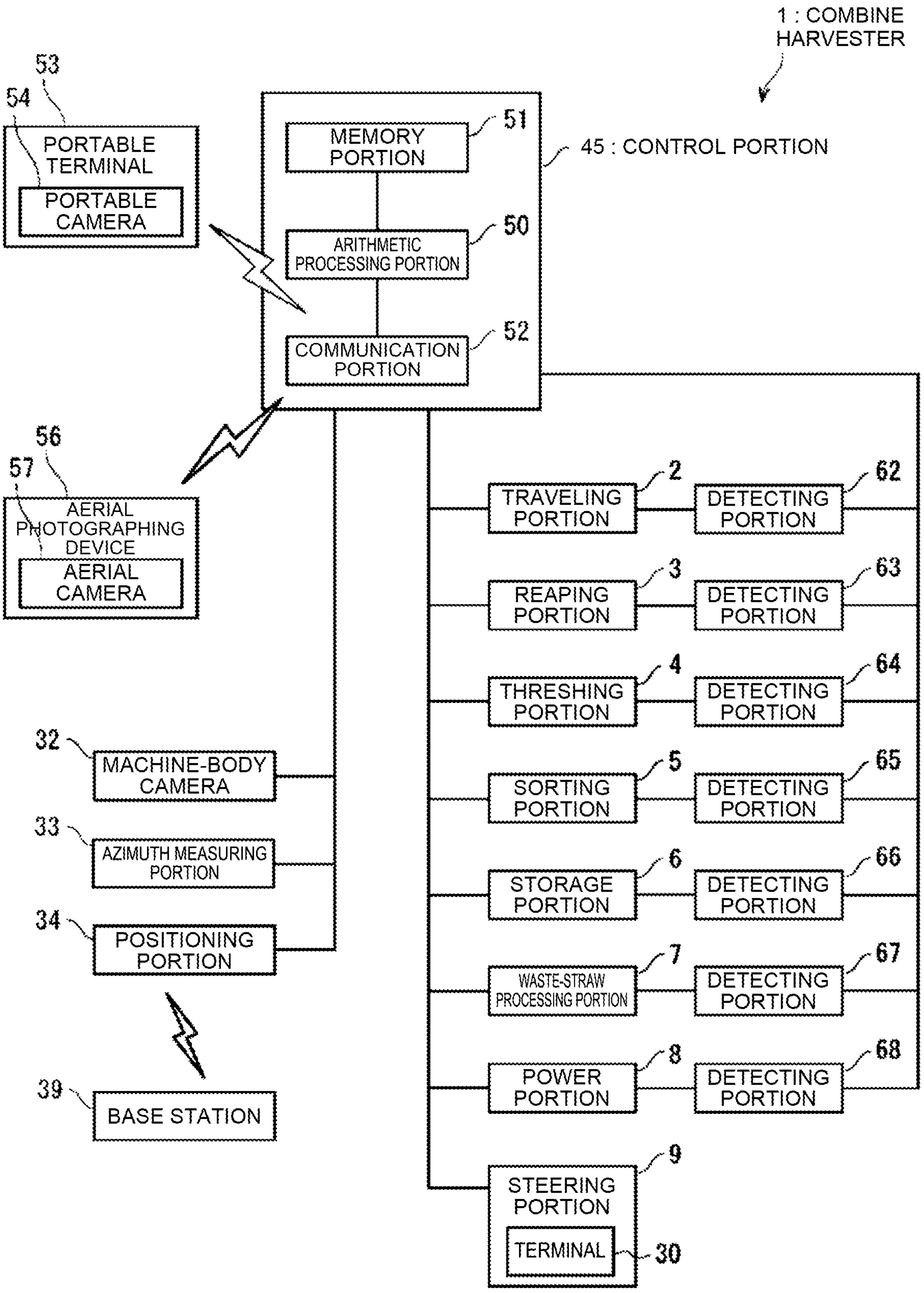
FIG. 3 is a block diagram illustrating an electrical configuration of the combine harvester according to the embodiment of the present invention.
Figure 4:
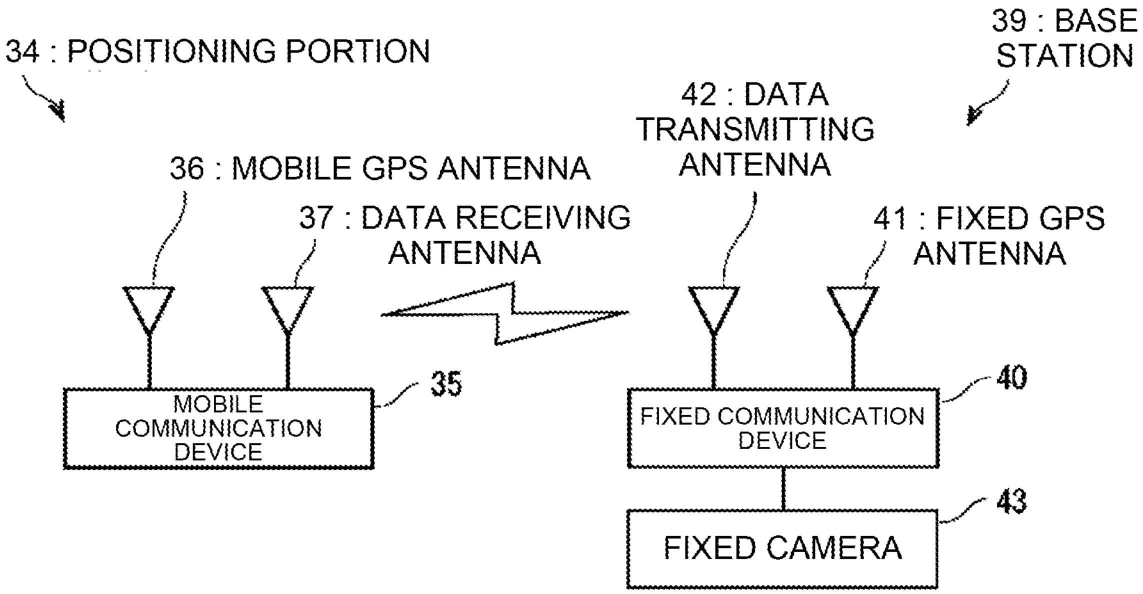
FIG. 4 is a block diagram illustrating a positioning portion and a base station according to the embodiment of the present invention.

First, an outline of the combine harvester 1 will be explained with reference to FIGS. 1 to 3. FIG. 1 is a left side view of the combine harvester 1. FIG. 2 is a plan view schematically illustrating a configuration of the combine harvester 1. FIG. 3 is a block diagram illustrating an electrical configuration of the combine harvester 1. FIG. 4 is a block diagram illustrating a positioning portion 34 and a base station 39. In each of the drawings, U, Lo, L, R, Fr, and Rr indicate up, down, left, right, front, and rear, respectively.

Outline of Combine Harvester

The combine harvester 1 includes a function of an automatic reaping work that performs a reaping work of grain culms while autonomously traveling in a field H, which is a work target. The combine harvester 1 can also travel by a manual operation by an operator. The combine harvester 1 can also control a travelling speed by the manual operation while steering is controlled autonomously.

As shown in FIG. 1, the combine harvester 1 includes a traveling portion 2, a reaping portion 3, a threshing portion 4, a sorting portion 5, a storage portion 6, a waste-straw processing portion 7, a power portion 8, and a steering portion 9. The combine harvester 1 is a so-called self-threshing combine harvester in which the grain culms (reaping target) reaped by the reaping portion 3 is threshed by the threshing portion 4, while traveling by the traveling portion 2, and then, the grains are sorted by the sorting portion 5 and stored in the storage portion 6. Furthermore, in the combine harvester 1, the waste straw after threshing is processed by the waste-straw processing portion 7. The combine harvester 1 drives the traveling portion 2, the reaping portion 3, the threshing portion 4, the sorting portion 5, the storage portion 6, and the waste-straw processing portion 7 by the power supplied from the power portion 8. The present invention may be applied to ordinary combine harvesters.

The traveling portion 2 is provided below a machine-body frame 10. The reaping portion 3 is provided in front of the machine-body frame 10. The threshing portion 4, the sorting portion 5, the storage portion 6, the waste-straw processing portion 7, the power portion 8, and the steering portion 9 are provided above the machine-body frame 10. The reaping portion 3, the threshing portion 4, the sorting portion 5, the storage portion 6, the waste-straw processing portion 7, the power portion 8, and the steering portion 9 are provided on the machine-body frame 10. The main-body portion 12 includes the machine-body frame 10, the reaping portion 3, threshing portion 4, the sorting portion 5, the storage portion 6, the waste-straw processing portion 7, the power portion 8, and the steering portion 9 and is supported by the traveling portion 2. That is, the combine harvester 1 is configured such that the traveling portion 2 travels while supporting the main-body portion 12.

The traveling portion 2 includes a pair of left and right crawler-type traveling devices 11 provided below the machine-body frame 10. The crawler-type traveling devices 11 are connected to an engine 27 via a transmission (not shown), and are rotated by power generated by the engine 27. The rotary drive of the left and right crawler-type traveling devices 11 is independently controlled, which enables forward, backward, and turning movements.

The reaping portion 3 is provided in front of the traveling portion 2. The reaping portion 3 is provided capable of being raised and lowered between a lowered position, which enables reaping of the grain culms on a field H, and a raised position, in which reaping of the grain culms is disabled. The reaping portion 3 includes a divider 13, a raising device 14, a cutting device 15, and a conveying device 16. The divider 13 guides the grain culms on the field H to the raising device 14. The raising device 14 raises the grain culms guided by the divider 13. The cutting device 15 cuts the grain culms raised by the raising device 14. The conveying device 16 is provided above a rear side of the cutting device 15 and on a left side of the main-body portion 12 and conveys the grain culms that were cut by the cutting device 15 toward the rear.

The threshing portion 4 is provided behind the reaping portion 3 and on the left side of the main-body portion 12. The threshing portion 4 includes a feed chain 18 and a threshing cylinder 19. The feed chain 18 conveys the grain culms that have been conveyed from the conveying device 16 of the reaping portion 3 for threshing and further conveys the grain culms after the threshing, that is, the waste straws, to the waste-straw processing portion 7. The threshing cylinder 19 threshes the grain culms conveyed by the feed chain 18.

The sorting portion 5 is provided below the threshing portion 4. The sorting portion 5 includes a swing sorting device 21, an air sorting device 22, a grain conveying device (not shown), and a waste-straw discharging device (not shown). The swing sorting device 21 sifts the threshed grains dropped from the threshing portion 4 and sorts them into grains, waste straws, and the like. The air sorting device 22 further sorts the threshed grains sorted by the swing sorting device 21 into grains, waste straws, and the like by blowing air. The grain conveying device conveys the grains sorted by the swing sorting device 21 and the air sorting device 22 to the storage portion 6. The waste-straw discharging device discharges the straw waste and the like sorted by the swing sorting device 21 and the air sorting device 22 to an outside of the machine.

The storage portion 6 is provided on the right side of the threshing portion 4. The storage portion 6 includes a grain tank 24 and a discharging device 25. The grain tank 24 stores the grains conveyed from the sorting portion 5. The discharging device 25 is constituted by an auger or the like and discharges the grains stored in the grain tank 24 to an arbitrary place.

The waste-straw processing portion 7 is provided behind the threshing portion 4. The waste-straw processing portion 7 includes a waste-straw conveying device (not shown) and a waste-straw cutting device (not shown). The waste-straw conveying device conveys the waste straws conveyed from the feed chain 18 of the threshing portion 4 to the waste-straw cutting device. The waste-straw cutting device cuts the waste straws conveyed by the waste-straw conveying device, and discharges them to the outside of the machine.

The power portion 8 is provided on the upper front side of the traveling portion 2. The power portion 8 includes the engine 27 which generates rotary power. The power portion 8 transmits the rotary power generated by the engine 27 to the traveling portion 2, the reaping portion 3, the threshing portion 4, the sorting portion 5, the storage portion 6, and the waste-straw processing portion 7.

The steering portion 9 is provided above the power portion 8. The steering portion 9 includes a driver's seat 29, a terminal 30 (see FIG. 3) including a touch panel, and a plurality of operation tools (not shown). The driver's seat 29 is provided, for example, on the right side of the main-body portion 12 and includes a chair or the like in which an operator is seated. The terminal 30 is provided at a position that can be operated by the operator seated in the driver's seat 29 (front right or front left of the operator, for example). The terminal 30 is a display portion which displays images and the like photographed by each of cameras 32, 43, and 57 described later as well as an operation portion which accepts operations on the combine harvester 1. The plurality of operation tools are operated by the operator seated in the driver's seat 29 and include a steering wheel for steering the combine harvester 1, an accelerator which adjusts a rotation speed of the engine 27 (the traveling speed of the combine harvester 1), an elevation switch that elevates the reaping portion 3 up and down and the like.

The combine harvester 1 includes a machine-body camera 32, a positioning portion 34, and an azimuth measuring portion 33 (see FIGS. 2 and 3).

[Machine-body camera] The machine-body camera 32 is provided on an upper part of the front side of the steering portion 9, for example, and photographs the field H.

[Positioning Portion]

The positioning portion 34 acquires position information indicating a position of the combine harvester 1 by using a satellite positioning system such as a GPS (Global Positioning System). The positioning portion 34 (see FIG. 3) includes a mobile communication device 35, a mobile GPS antenna 36, and a data receiving antenna 37. The mobile communication device 35 receives a signal from a GPS satellite via the mobile GPS antenna 36 and acquires the position information of the combine harvester 1 by calculating the position of the combine harvester 1 (strictly speaking, the position of the mobile GPS antenna 36) using the received signal. The mobile communication device 35 acquires the position information at predetermined time intervals. The mobile GPS antenna 36 is provided, for example, on the left side of the steering portion 9 and at substantially the center in a left-right direction of the main-body portion 12.

[Azimuth Measuring Portion]

The azimuth measuring portion 33 is, for example, an angular velocity sensor (gyro sensor), a triaxial acceleration sensor, a geomagnetic sensor and the like and acquires azimuth information indicating the azimuth of the combine harvester 1 by measuring the azimuth of the combine harvester 1.

[Base Station]

A base station 39 is installed on a ridge or the like in a periphery of the field H, which is the work target of the combine harvester 1. The base station 39 includes a fixed communication device 40, a fixed GPS antenna 41, a data transmitting antenna 42, and a fixed camera 43. The fixed communication device 40 communicates with the GPS satellite via the fixed GPS antenna 41 to acquire the position information of the base station 39. The fixed communication device 40 transmits correction information based on the position information of the base station 39 to the mobile communication device 35 via the data transmitting antenna 42. The fixed camera 43 photographs the field H. The fixed communication device 40 acquires an image (field image) photographed by the fixed camera 43 and transmits the field image to the mobile communication device 35 via the data transmitting antenna 42. The mobile communication device 35 of the positioning portion 34 receives the correction information and the field image transmitted from the fixed communication device 40 of the base station 39 via the data receiving antenna 37. The mobile communication device 35 corrects the position information of the combine harvester 1 on the basis of the correction information. Note that the base station 39 does not have to be installed, and correction of the position information by the base station 39 does not have to be made.

[Control Portion]

The control portion 45 includes an arithmetic processing portion 50, a memory portion 51, and a communication portion 52. The various constituent elements of the combine harvester 1 described above are connected to the control portion 45 via a communication interface. The control portion 45 controls the various constituent elements of the combine harvester 1 in accordance with input operations by the operator via the steering portion 9.

The memory portion 51 is, for example, a ROM (Read Only Memory), a RAM (Random Access Memory), a hard disk drive, a flash memory or the like and stores programs and data for controlling the various constituent elements and various functions of the combine harvester 1. The arithmetic processing portion 50 is, for example, a CPU (Central Processing Unit) and controls the various constituent elements and various functions of the combine harvester 1 by executing arithmetic processing using the programs and data stored in the memory portion 51. Note that the control portion 45 may be realized by an integrated circuit that does not use a program, instead of a processor or the like that executes programs and the like.

The communication portion 52 conducts wireless communication with a portable terminal 53 carried by the operator. The portable terminal 53 is, for example, a tablet including a touch panel and includes a function that remotely controls the combine harvester 1. The portable terminal 53 includes a portable camera 54 that photographs the field H. Furthermore, the communication portion 52 conducts wireless communication with an aerial photographing device 56 such as a drone. The aerial photographing device 56 includes an aerial photographing camera 57 that photographs the field H. When the operator inputs a performance instruction for the aerial photographing device 56 into the terminal 30 or the portable terminal 53, the aerial photographing device 56 performs in accordance with the performance instruction transmitted from the communication portion 52. Note that the aerial photographing device 56 may conduct wireless communication with the portable terminal 53 instead of, or in addition to, the communication portion 52. Note that the portable terminal 53 and the aerial photographing device 56 may be omitted.

When the operator inputs a photographing instruction for each of the cameras (the machine-body camera 32 of the combine harvester 1, the fixed camera 43 of the base station 39, and the aerial photographing camera 57 of the aerial photographing device 56) into the terminal 30 or the portable terminal 53 (hereinafter, referred to as the terminal 30 or the like), the control portion 45 controls each of the cameras 32, 43, and 57 and causes them to photograph the field H. The control portion 45 causes the field image photographed by each of the cameras 32, 43, and 57 to be displayed on the terminal 30 or the like. When the operator inputs a display instruction of the field image photographed by the portable camera 54 of the portable terminal 53 into the terminal 30 or the like, the control portion 45 controls the portable terminal 53 via the communication portion 52 and causes the terminal or the like to display the field image. Note that the field image does not have to be displayed.

The control portion 45 acquires the position information of the combine harvester 1 from the positioning portion 34 and stores it in the memory portion 51. Moreover, the control portion 45 acquires field information including the outer shape of the field H (shape of an outer edge of the field H) and outer shapes of an unreaped land H0 and a reaped land H1 in the field H and stores them in the memory portion 51 (an example of a field-information acquiring portion). Specifically, only one session of reaping around the field H is performed by a manual operation, and the outer shape of the field H is depicted by the position information acquired using the positioning portion 34 during the round. Alternatively, the outer shape of the field H may be acquired by the operator by specifying the outer shape of the field H on a map displayed on the terminal 30. The position information while the combine harvester 1 is traveling is updated at predetermined time intervals and stored in the memory portion 51 each time it is updated. The control portion 45 calculates the outer shape of the reaped land H1 from a route on which the combine harvester 1 has traveled in the field H (history of position information of the combine harvester 1) and a reaped width of the reaping portion 3 and calculates the outer shape of the unreaped land H0 from the outer shape of the field H and the outer shape of the reaped land H1.

The control portion 45 acquires route information representing the planned travel route of the combine harvester 1. Specifically, the control portion 45 acquires the travel route manually input by the operator using the terminal 30 or the like and stores it in the memory portion 51. Alternatively, the control portion 45 may be configured to set the travel route in accordance with a predetermined algorithm on the basis of the field information.

The control portion 45 causes the combine harvester 1 to perform an automatic reaping work in which the reaping portion 3 is caused to reap the grain culms while the traveling portion 2 is caused to travel autonomously in accordance with route information. Furthermore, the control portion 45 controls the threshing portion 4, the sorting portion 5, the storage portion 6, and the waste-straw processing portion 7 and causes them to execute processing such as threshing of the grain culms after the reaping, sorting of the grains and waste straws, storage of the grains, processing of the waste straw and the like.

Subsequently, the combine harvester 1 according to this embodiment will be described in detail. The combine harvester 1 includes the main-body portion 12 including the reaping portion 3 which reaps grain culms, the traveling portion 2 which travels while supporting the main-body portion 12, the detecting portions 62 to 68 which detect an abnormality in the main-body portion 12, and the control portion 45 which executes control such that, when the detecting portions 62 to 68 detect an abnormality during performance of the automatic reaping in which the reaping portion 3 is caused to reap the grain culms, while the traveling portion 2 is caused to travel autonomously, after the automatic reaping work is interrupted, the traveling portion 2 is caused to travel backward by the first predetermined distance D1. The main-body portion 12 and the traveling portion 2 are as described above. The configuration of the detecting portions 62 to 68 and the motions of the combine harvester 1 controlled by the control portion 45 will be described in detail below.

[Detecting Portion]

The detecting portions 62, 63, 64, 65, 66, 67, and 68 are sensors that detect abnormalities in the traveling portion 2, the reaping portion 3, the threshing portion 4, the sorting portion 5, the storage portion 6, the waste-straw processing portion 7, and the power portion 8, respectively. The detecting portions 62 to 68 are, for example, acceleration sensors, torque sensors, optical sensors, image sensors and the like. At least one type of sensor in these plural types of sensors is provided in the traveling portion 2, the reaping portion 3, the threshing portion 4, the sorting portion 5, the storage portion 6, the waste-straw processing portion 7, and the power portion 8.

As an example, detection of an abnormality in the conveying device 16 of the reaping portion 3 will be explained. For example, the acceleration sensor is provided on an immovable part such as a frame of the conveying device 16. When the conveying device 16 is jammed with the grain culms, vibrations larger than usual are generated in the conveying device 16. When an amplitude of acceleration detected by the acceleration sensor reaches a threshold value, the control portion 45 determines that an abnormality in the conveying device 16 is detected.

As an example of a torque sensor, the torque sensor is provided in a drive portion that drives the conveying device 16. If the conveying device 16 is jammed with grain culms, a torque of the drive portion rises as conveyance of the grain culms stops. When the torque detected by the torque sensor reaches the threshold value, the control portion 45 determines that an abnormality in the conveying device 16 was detected.

As an example of an optical sensor (transmissive type), a light emitting portion and a light receiving portion oppose each other with a conveyance path of the conveying device 16 between them, and light emitted by the emitting portion is detected by the light receiving portion. If the conveying device 16 is jammed with grain culms, the light receiving portion will not detect the light, since the grain culms block the light. If the light receiving portion no longer detects light, the control portion 45 determines that an abnormality has occurred in the conveying device 16.

As an example of the image sensor, the image sensor takes an image of the conveyance path of the conveying device 16. The memory portion 51 stores an image of the conveyance path when the grain culms are not jammed, and if the taken image shows a pattern different from the image stored in the memory portion 51, the control portion 45 determines that an abnormality has occurred in the conveying device 16.

The detecting portions 62 to 68 detect a sign of an abnormality in addition to the abnormalities in the main-body portion 12 and the traveling portion 2. For example, a second threshold value, which is smaller than the above threshold value (first threshold value), is set for the acceleration of the conveying device 16, and when the amplitude reaches the second threshold value, the control portion 45 determines that a sign of an abnormality in the conveying device 16 was detected. The detection of abnormalities and the detection of signs of abnormalities may be performed by separate sensors. For example, it may be so configured that jamming of grain culms is detected using the image sensor, and a sign of the jamming of the grain culms is detected using the torque sensor.

[Motion of Combine Harvester]

Figure 5:
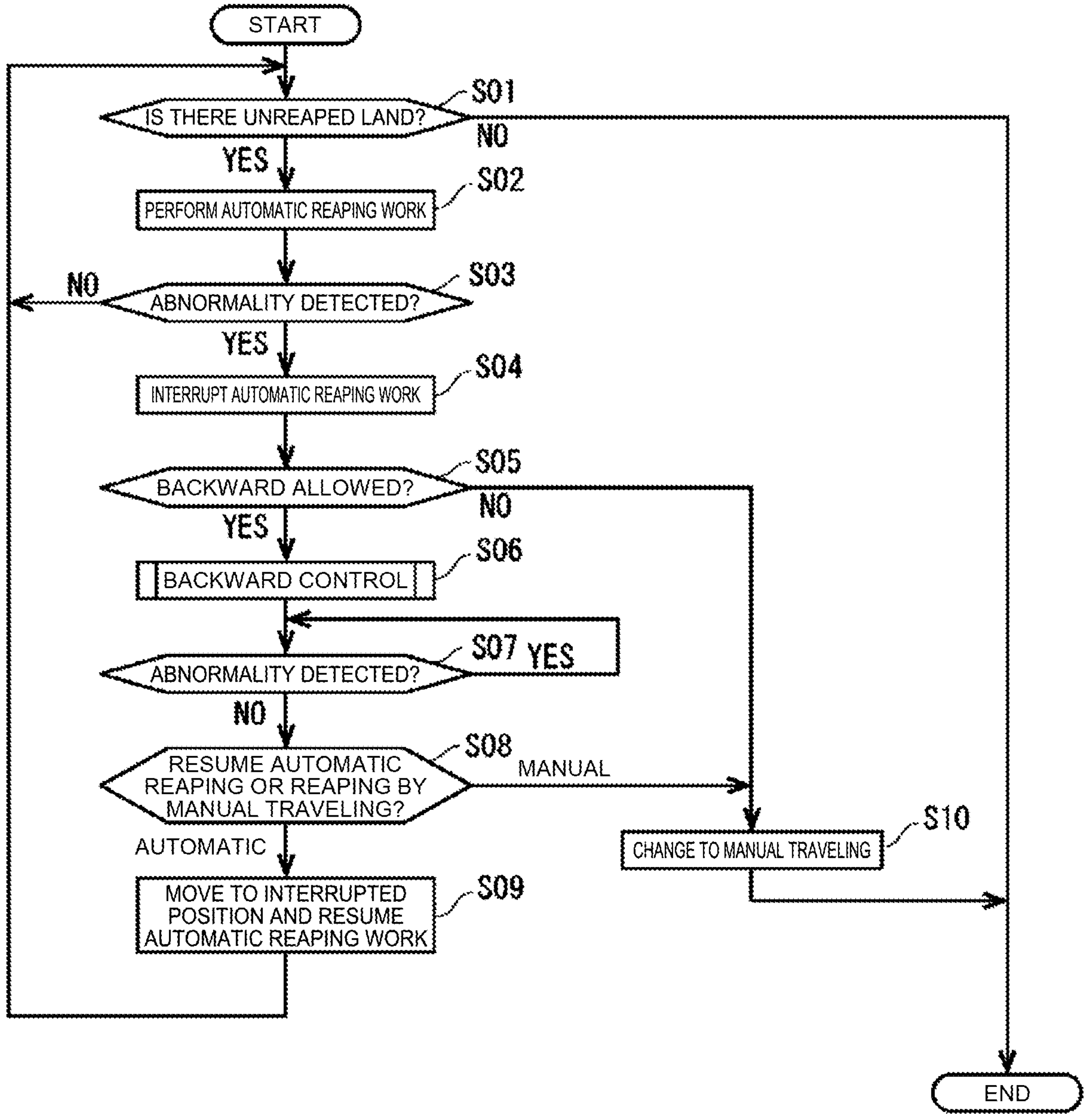
FIG. 5 is a flowchart of control executed by a control portion according to the embodiment of the present invention.
Figure 6:
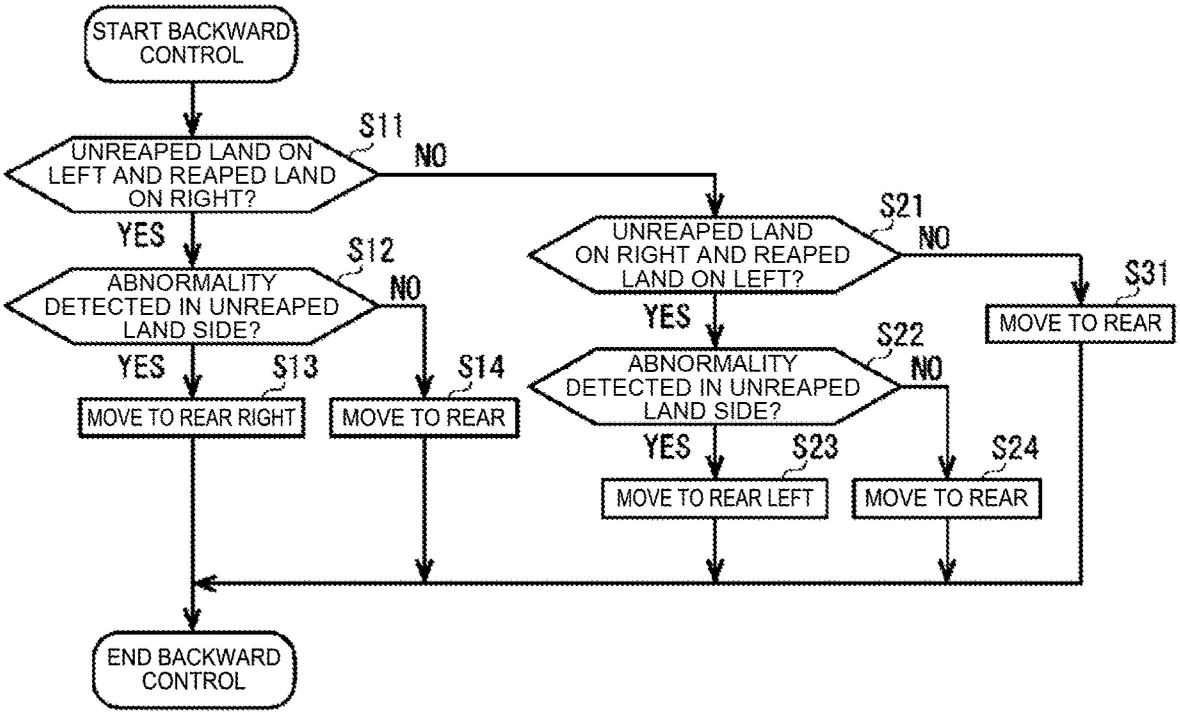
FIG. 6 is a flowchart of backward control executed by the control portion according to the embodiment of the present invention.
Figure 7:
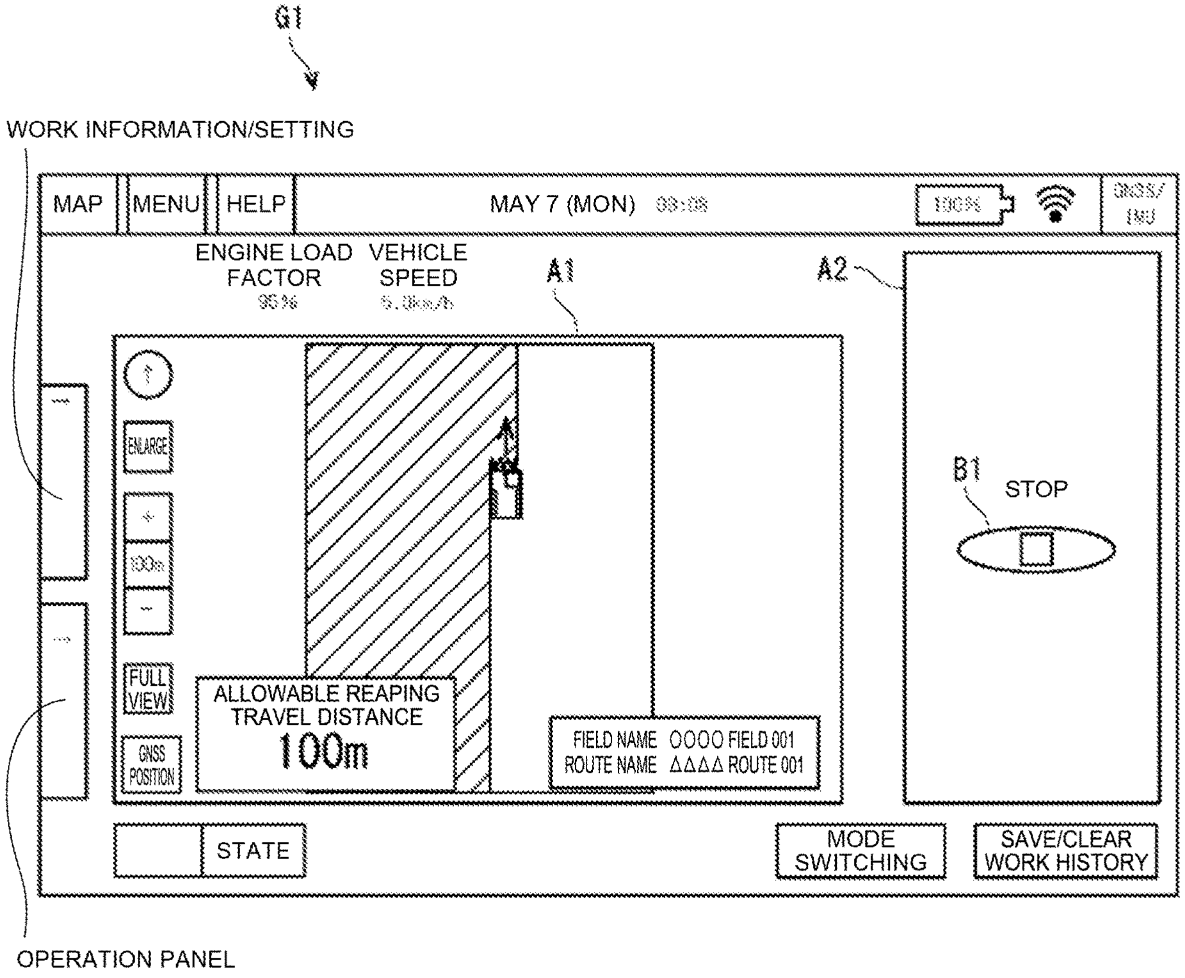
FIG. 7 is a diagram illustrating a screen during performance of automatic reaping according to the embodiment of the present invention.
Figure 8:
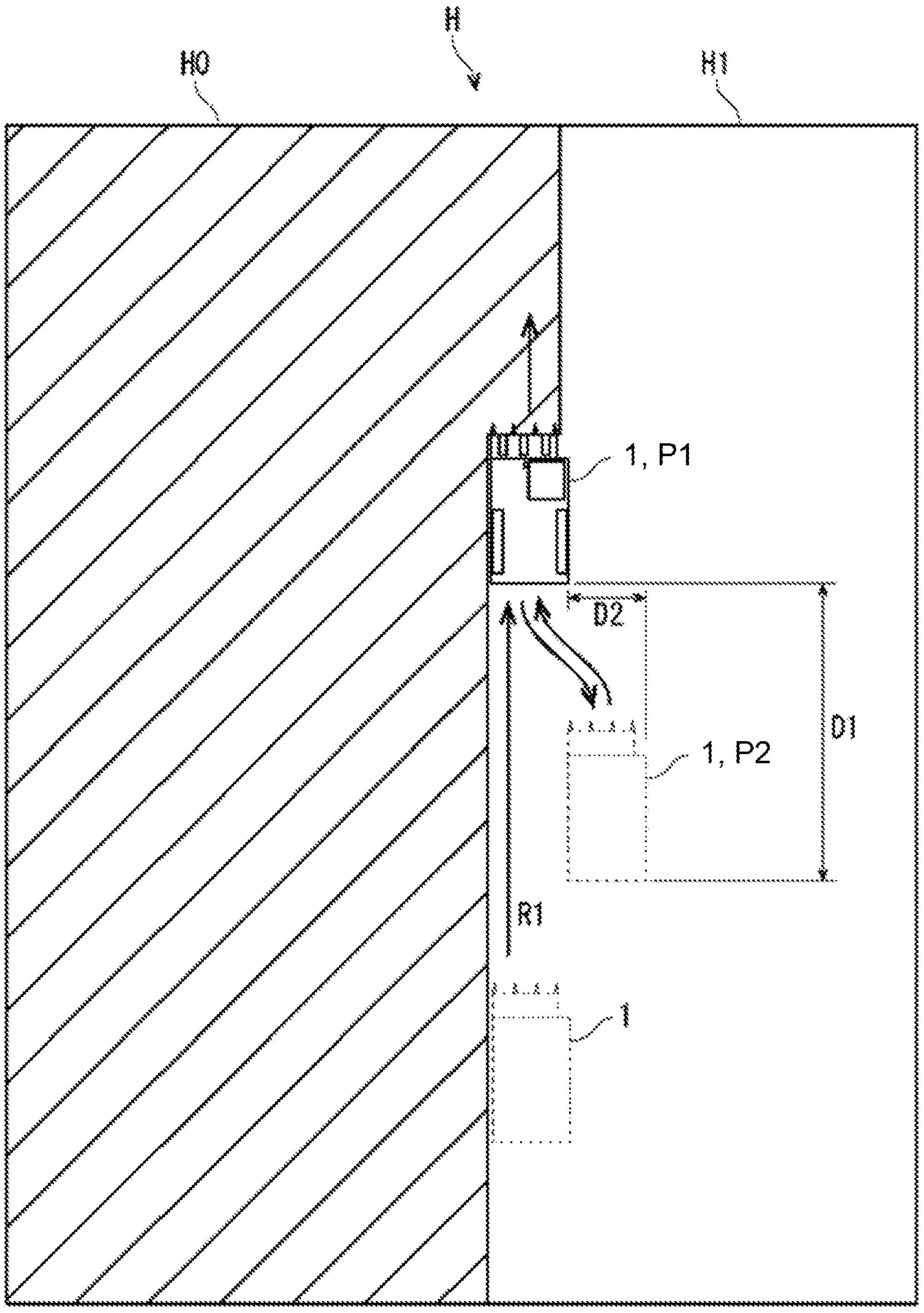
FIG. 8 is a diagram illustrating a traveling motion of the combine harvester according to the embodiment of the present invention.
Figure 9:
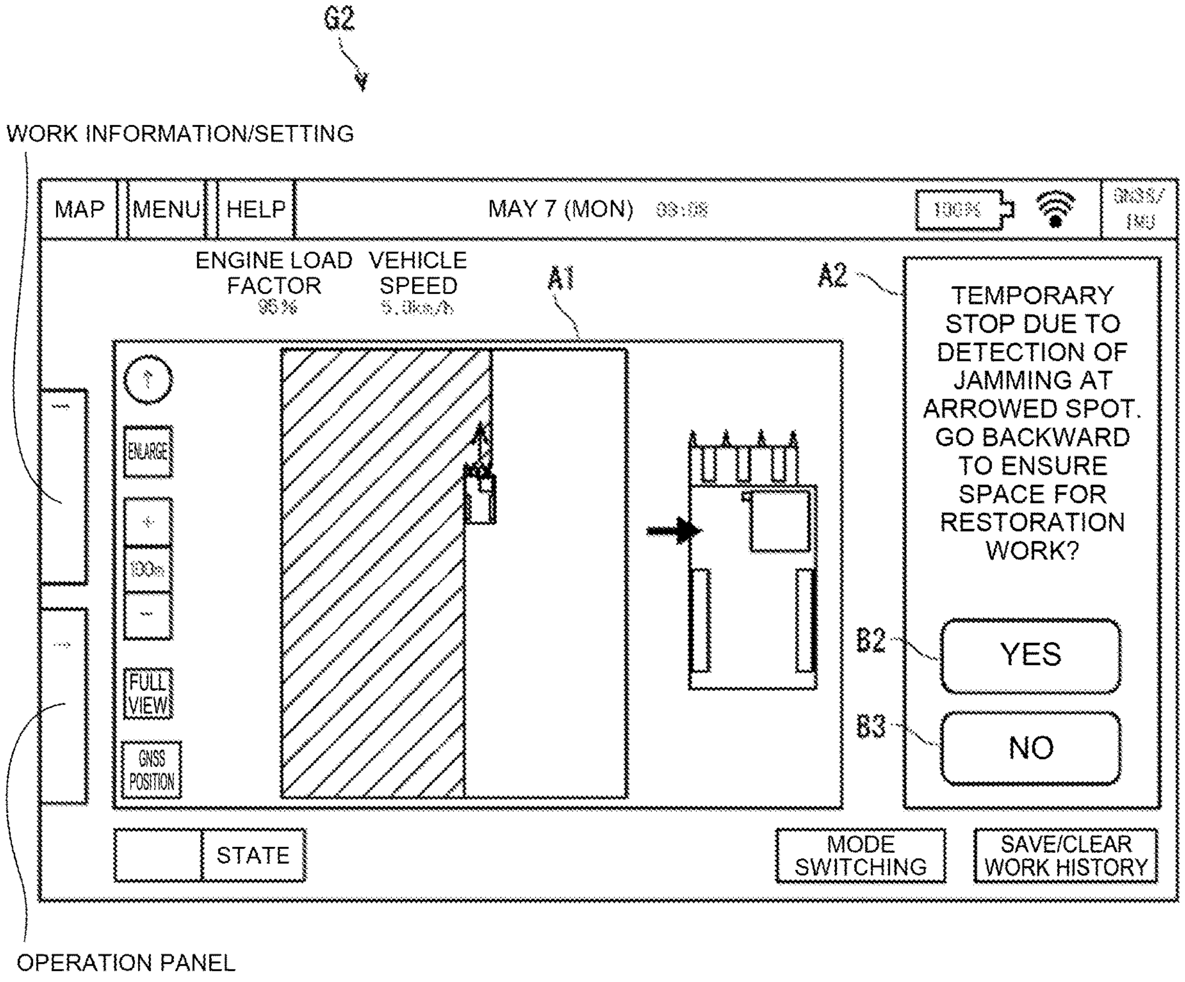
FIG. 9 is a diagram illustrating a screen while automatic reaping according to the embodiment of the present invention is temporarily stopped.
Figure 14:
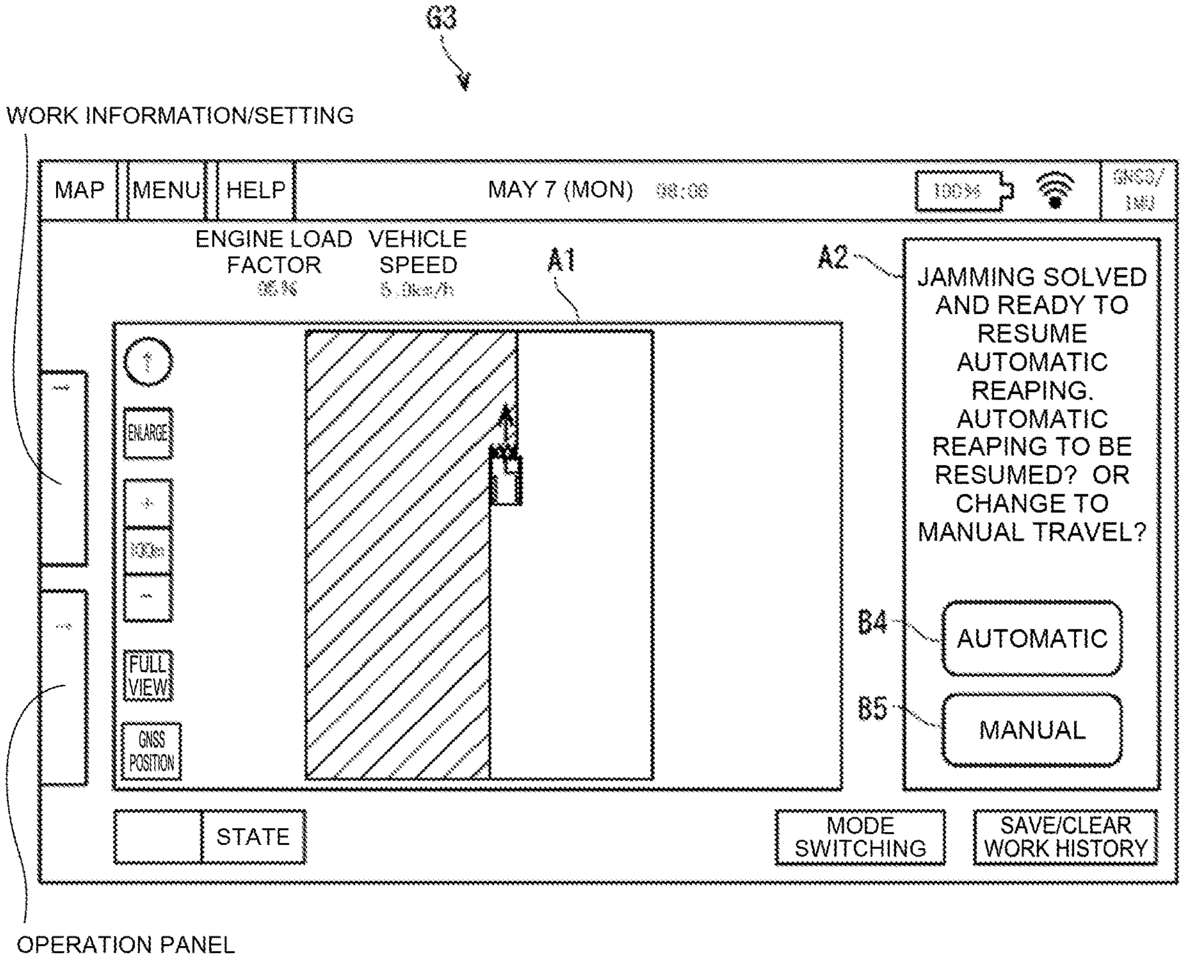
FIG. 14 is a diagram illustrating a screen during standby for automatic-reaping resumption according to the embodiment of the present invention.

Subsequently, the motions of the combine harvester 1 will be explained. FIG. 5 is a flowchart of the control executed by the control portion 45. FIG. 6 is a flowchart of the backward control executed by the control portion 45. FIG. 7 is a diagram showing a screen G1 during the automatic reaping. FIG. 8 is a diagram showing a traveling motion of the combine harvester 1. FIG. 9 is a diagram showing a screen G2 while the automatic reaping is temporarily stopped. FIGS. 10 to 13 are diagrams showing the traveling motion of the combine harvester 1. FIG. 14 is a diagram showing a screen G3 during standby for automatic-reaping resumption. In FIG. 5, Steps S01 and S02 are examples of the automatic reaping process. Steps S03 to S06 are examples of the backward control process. Steps S07 to S09 are examples of the automatic-reaping resumption process.

The combine harvester 1 moves to a reaping start position in the field H by autonomous traveling or manual traveling. When the operator selects the automatic reaping work on a menu screen displayed on the terminal 30 or the like (not shown) at the reaping start position, the control portion 45 checks a state of each portion of the combine harvester 1 using the detecting portions 62 to 68, and if there is no abnormality in the state of each portion, it starts control of the automatic reaping work in accordance with the flowchart in FIG. 5. Although the automatic reaping work can be performed even if the operator is not onboard the combine harvester 1, a work to solve the abnormality can be started more quickly if the operator is onboard.

First, the control portion 45 refers to the field information and determines if there is an unreaped land H0. If there is no unreaped land H0 (Step S01: NO), the control portion 45 ends control of the automatic reaping work. If there is an unreaped land H0 (Step S01: YES), the control portion 45 controls the reaping portion 3, the threshing portion 4, the sorting portion 5, the storage portion 6, the waste-straw processing portion 7, and the power portion 8 to cause them to perform the automatic reaping work (Step S02) while the traveling portion 2 is caused to travel autonomously in accordance with the route information. The example in FIG. 8 is an example of reciprocating reaping performed from right to left in which traveling in an R1 direction and in a direction opposite thereto is repeated alternately. A shaded part is the unreaped land H0, and an area to the right of the unreaped land H0 is the reaped land H1.

During the performance of the automatic reaping work, the control portion 45 causes the screen G1 shown in FIG. 7 to be displayed on the terminal 30 or the like. In a first area A1 of the screen G1, an illustration of an inside of the field H and the combine harvester 1 is displayed, and the position of the combine harvester 1 and outer edges of the unreaped land H0 and the reaped land H1 are updated at each predetermined time. A "Stop" button B1 is displayed in a second area A2 of the screen G1, allowing the operator to stop the automatic reaping work at his/her discretion.

Subsequently, the control portion 45 determines whether an abnormality or a sign of an abnormality in the main-body portion 12 (the reaping portion 3, the threshing portion 4, the sorting portion 5, the storage portion 6, the waste-straw processing portion 7, and the power portion 8) was detected by the detecting portions 63 to 68 (Step S03). If an abnormality or a sign of an abnormality was not detected in any part (Step S03: NO), the control portion 45 repeats the processing at Step S01 and after. On the other hand, if it is determined that an abnormality or a sign of an abnormality was detected in any part (Step S03: YES), the control portion 45 controls the main-body portion 12 and the traveling portion 2 and causes the automatic reaping work to be interrupted (Step S04). For example, if an abnormality was detected at a point P1 shown in FIG. 8, the control portion 45 causes the automatic reaping work to be interrupted at the point P1 (the interrupted position). At this time, the control portion 45 raises the reaping portion 3.

Subsequently, the control portion 45 determines whether the backward travel was allowed (Step S05) on the terminal 30 or the like, or specifically, the control portion 45 causes the screen G2 shown in FIG. 9 to be displayed on the terminal 30 or the like. On the screen G2, a message that the jamming was detected, an illustration showing a position where the jamming was detected, a question text asking the operator whether the backward travel is to be made, and a "Yes" button B2 and a "No" buttons B3 are displayed. If the operator operates the "No" button B3, the control portion 45 determines that the backward travel was not permitted (Step S05: NO), changes to manual travel (Step S10) and then, ends the control of the automatic reaping work. On the other hand, if the operator operates the "Yes" button B2, the control portion 45 determines that the backward travel was allowed (Step S05: YES) and shifts to the backward control (Step S06). Since safety is ensured by stopping the backward travel when an obstacle on the rear was detected by the sensor (not shown), the processing at Steps S05, S10 may be omitted.

Subsequently, the backward control will be explained with reference to FIG. 6. First, the control portion 45 refers to the field information and determines whether the left of the combine harvester 1 is the unreaped land H0 and the right is the reaped land H1 (Step S11). In the example in FIG. 8, the control portion 45 determines that the left is the unreaped land H0 and the right is the reaped land H1 (Step S11: YES).

Subsequently, the control portion 45 determines whether an abnormality was detected in a part on the unreaped land H0 side of the combine harvester 1 (the conveying device 16, the threshing portion 4, for example) (Step S12). If an abnormality was detected on a part of the unreaped land H0 side of the combine harvester 1 (Step S12: YES), the control portion 45 causes the combine harvester 1 to move from the point Pb to the point P2 on the rear right (Step S13). Specifically, the control portion 45 controls the traveling portion 2 to travel backward by the first predetermined distance D1 (5 m, for example) and to travel away from the unreaped land H0 to the right by the second predetermined distance D2 (2 m, for example). The first predetermined distance D1 and the second predetermined distance D2 may be fixed values set in advance or may be set values set by the user. Moreover, the control portion 45 may be configured to set the first predetermined distance D1 and the second predetermined distance D2 in accordance with the situation around the combine harvester 1 photographed by each of the cameras 32, 43, 57 and a size of the machine body of the combine harvester 1 and the like. The first predetermined distance D1 and the second predetermined distance D2 may be values different from each other or may be the same value.

On the other hand, if an abnormality was detected in a part of the combine harvester 1 on the reaped land H1 side (the storage portion 6, the power portion 8, for example) (Step S12: NO), the control portion 45 causes the combine harvester 1 to move to the rear (Step S14). Specifically, the control portion 45 controls the traveling portion 2 to travel backward by the first predetermined distance D1.

Figure 10:
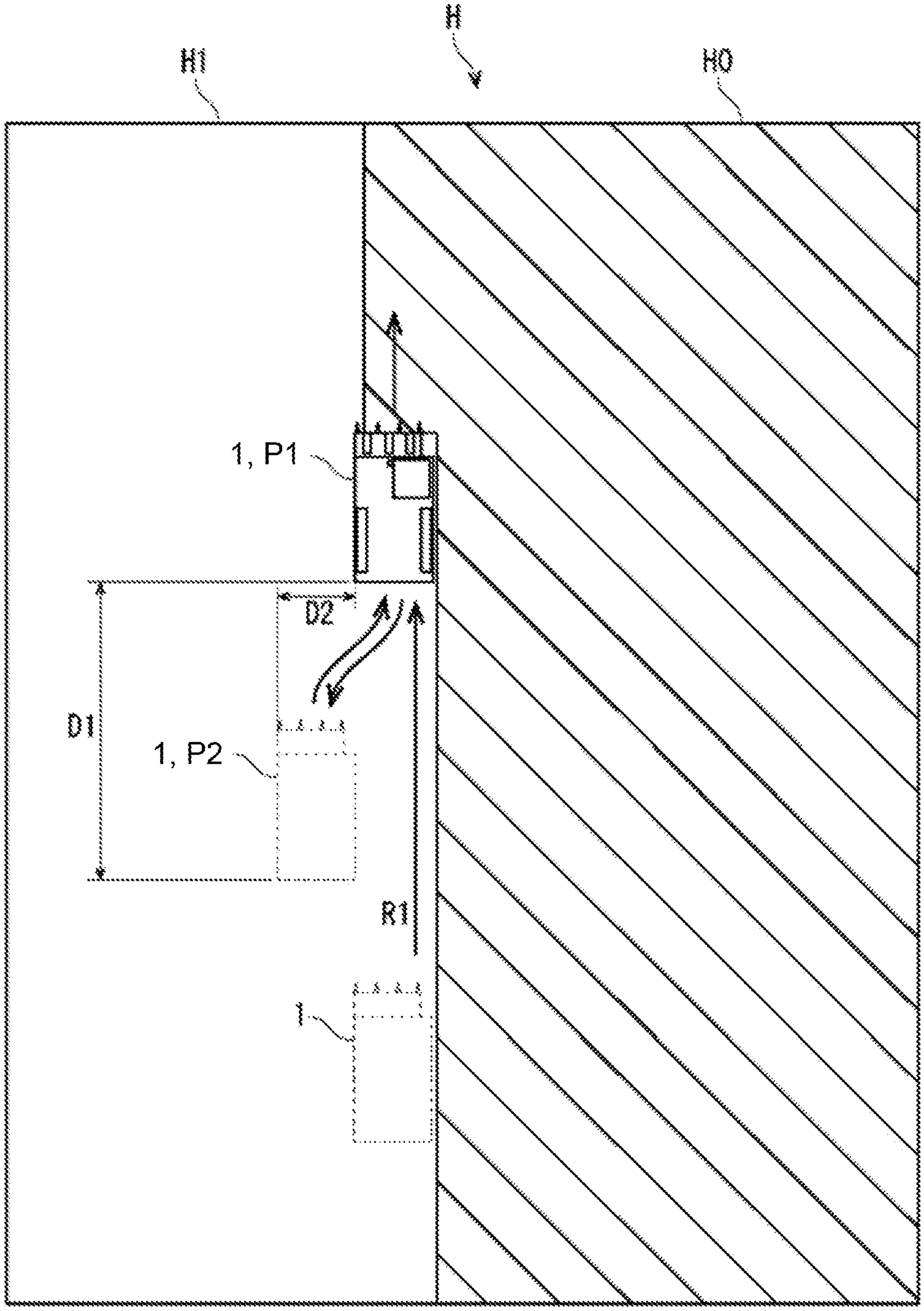
FIG. 10 is a diagram illustrating a traveling motion of the combine harvester according to the embodiment of the present invention.

As another example, the example in FIG. 10 shows that reciprocating reaping is performed from left to right. In this case, the control portion 45 determines to be NO at Step S11 and thus, it is determined at Step S21 whether the right is the unreaped land H0 and the left is the reaped land H1. In the case of FIG. 10, the control portion 45 determines that the right is the unreaped land H0 and the left is the reaped land H1 (Step S21: YES).

Subsequently, the control portion 45 determines whether an abnormality was detected in a part on the unreaped land H0 side of the combine harvester 1 (the storage portion 6, the power portion 8, for example) (Step S22). If an abnormality is detected in a part of the unreaped land H0 side of the combine harvester 1 (Step S22: YES), the control portion 45 causes the combine harvester 1 to move from the point P1 to the point P2 on the rear left (Step S23). Specifically, the control portion 45 controls the traveling portion 2 to travel backward by the first predetermined distance D1 and to travel away from the unreaped land H0 to the left by the second predetermined distance D2.

On the other hand, if an abnormality was detected in a part of the reaped land H1 side of the combine harvester 1 (the conveying device 16, the threshing portion 4, for example)

(Step S22: NO), the control portion 45 causes the combine harvester 1 to move to the rear (Step S24).

Figure 11:
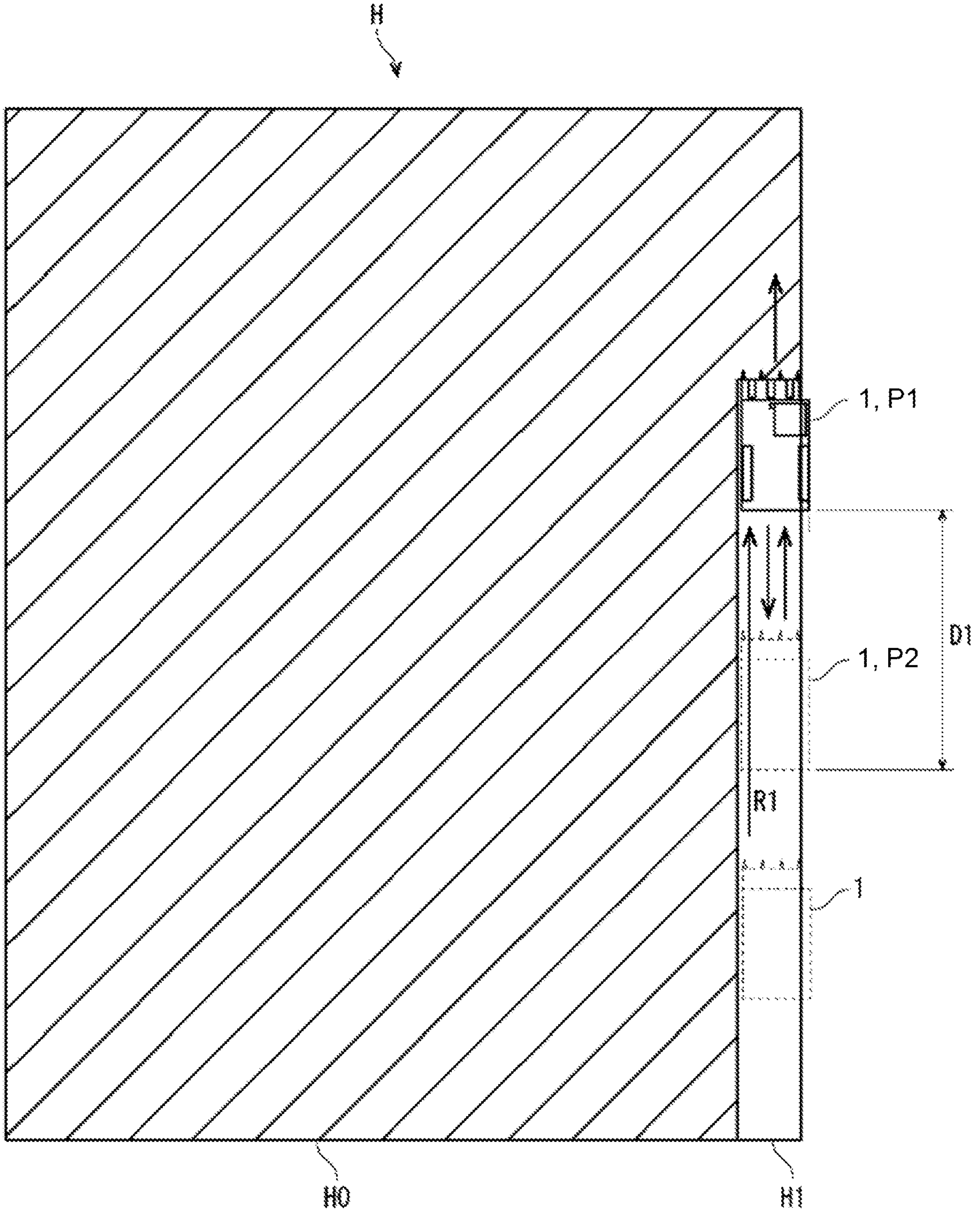
FIG. 11 is a view illustrating a traveling motion of the combine harvester according to the embodiment of the present invention.
Figure 12:
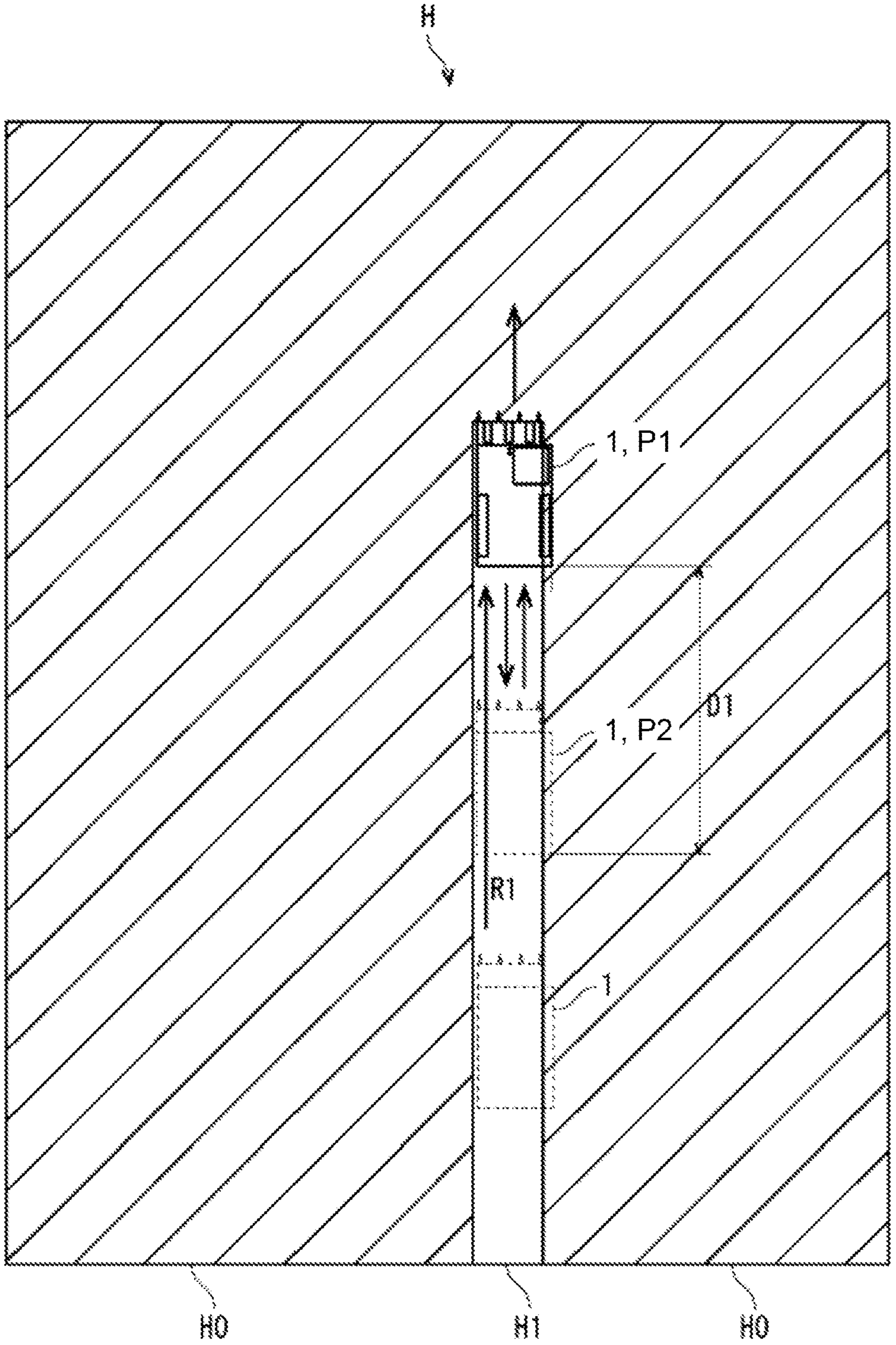
FIG. 12 is a diagram illustrating a traveling motion of the combine harvester according to the embodiment of the present invention.
Figure 13:
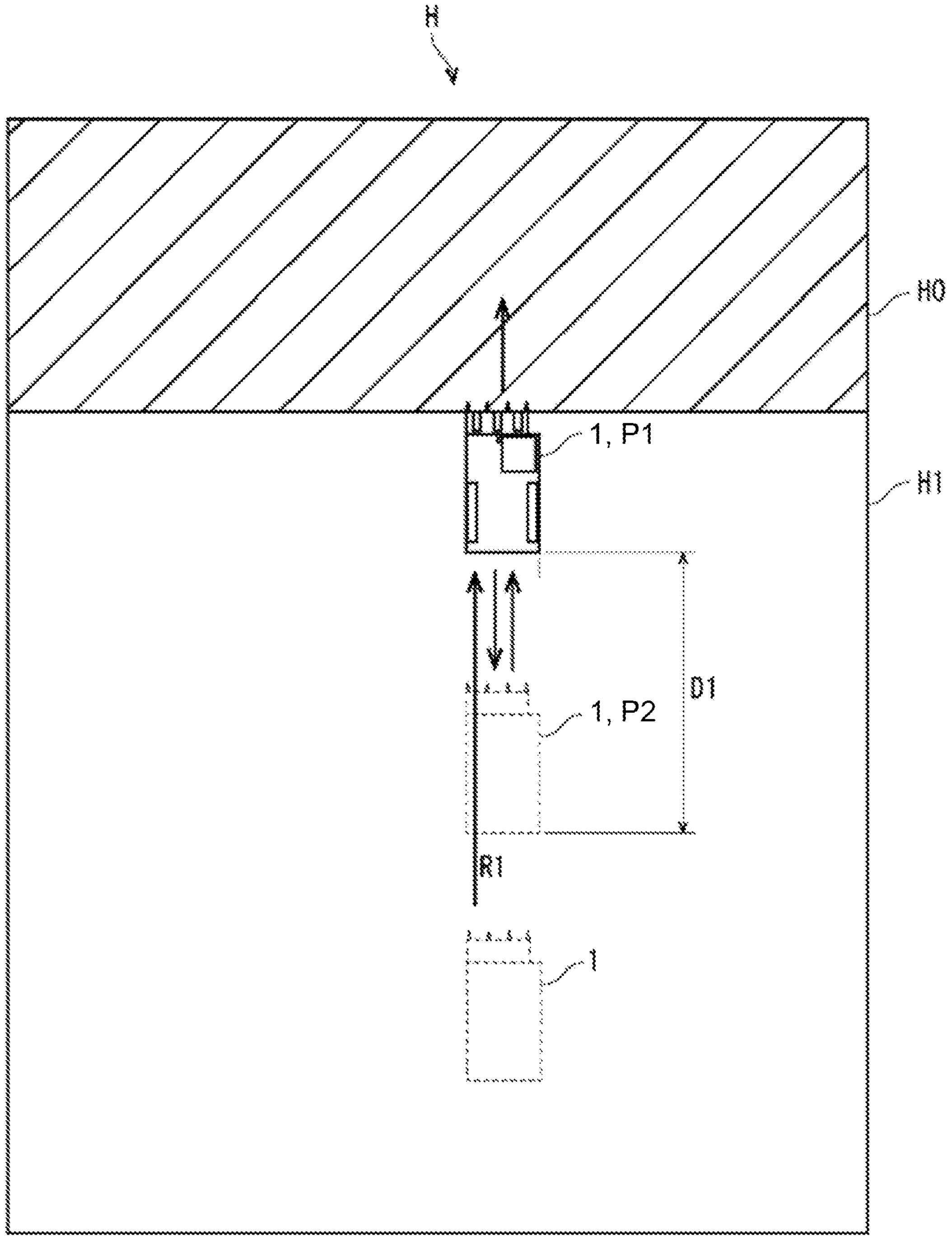
FIG. 13 is a diagram illustrating a traveling motion of the combine harvester according to the embodiment of the present invention.

As still another example, in FIG. 11, a state where there is no reaped land H1 on the side of the combine harvester 1 at the start of the reciprocating reaping is shown. FIG. 12 shows a state where the reaping was started from a position closer to the center of the field H and not along the end of the field, and in this case, too, there is no reaped land H1 on the side of the combine harvester 1. In the example in FIG. 13, there is no need to move the combine harvester 1 to the side, since there is the reaped land H1 on the left and right of the combine harvester 1. In these cases, since the control portion 45 determines to be NO at Step S11 and Step S21, it causes the combine harvester 1 to move to the rear by the first predetermined distance D1 (Step S31). If the distance to the unreaped land H0 ahead is a predetermined distance or more as at turning, for example, the traveling backward is not necessary. Thus, it may be so configured that the control portion 45 calculates the distance to the unreaped land H0 ahead from the image photographed by the machine-body camera 32, and if the calculated distance is the predetermined distance or more, the combine harvester 1 is not caused to travel backward.

At least after the combine harvester 1 was moved backward by the backward control described above, the operator performs a work to solve the abnormality. For example, if grain culms are jammed in the conveying device 16 or the threshing portion 4, the operator removes the jammed grain culms and threshes them by hand using the threshing portion 4 in a prescribed procedure.

When the backward control is finished, the control portion 45 determines whether an abnormality was detected in the main-body portion 12 (FIG. 5, Step S07). If it is determined that an abnormality was detected in any part (Step S07: YES), the control portion 45 repeats the processing at Step S07.

On the other hand, if an abnormality was not detected in any part (Step S07: NO), the control portion 45 determines whether resumption of the automatic reaping work was allowed (Step S08). Specifically, the control portion 45 causes the screen G3 shown in FIG. 14 to be displayed on the terminal 30 and the like. On the screen G3, a message that the jamming was solved, a question to select between the resumption of the automatic reaping work and the reaping by manual travel, and the "Automatic" button B4 and the "Manual" button B5 are displayed. When the operator operates the "Manual" button B5, the control portion 45 determines that the resumption of the automatic reaping work was not allowed and the reaping work by manual travel was selected (Step S08: Manual) and changes to manual travel (Step S10). On the other hand, when the operator operates the "Automatic" button B4, the control portion 45 determines that the resumption of the automatic reaping work was allowed (Step S08: YES), causes the combine harvester 1 to move from the point P2 to the point P1 (interrupted position), to lower the reaping portion 3, and to resume the automatic reaping work (Step S09). At this time, the control portion 45 may control the traveling portion 2 to move to the interrupted position at a speed slower than the set speed in the automatic reaping work. If an abnormality in the traveling portion 2 is detected, the above control is discontinued, the automatic reaping work is stopped, and the combine harvester 1 is stopped.

According to the combine harvester 1 according to this embodiment described above, the control portion 45 executes control such that the automatic reaping work in which the reaping portion 3 is caused to reap the grain culms while the traveling portion 2 is caused to travel autonomously, and when an abnormality is detected by the detecting portions 63 to 68, excluding the detecting portion 62 of the traveling portion 2, during performance of the automatic reaping work, the automatic reaping work is interrupted and then, the traveling portion 2 is caused to travel backward by the first predetermined distance D1. According to this configuration, if an abnormality occurs in the combine harvester 1 during the automatic reaping work, a space is provided in front of the combine harvester 1 and thus, a work to solve the abnormality can be performed easily.

According to the combine harvester 1, the control portion 45 executes control such that, when the detecting portions 63 to 68 detect a sign of an abnormality during the performance of the automatic reaping work, after the automatic reaping work is interrupted, the traveling portion 2 is caused to travel backward by the first predetermined distance D1. According to this configuration, even if a sign of an abnormality occurs, a space can be provided in front of the combine harvester 1 and thus, a work to prevent the abnormality can be performed easily.

According to the combine harvester 1 according to this embodiment, when the field information indicates that one of the left and right of the main-body portion 12 is the unreaped land H0 and the other is the reaped land H1, and when the detecting portions 63 to 68 detect an abnormality or a sign of an abnormality during performance of the automatic reaping work, the control portion 45 executes control such that the traveling portion 2 is caused to travel backward by the first predetermined distance D1 and to travel away from the unreaped land H0 to the side by the second predetermined distance D2. According to this configuration, since a space is provided also on the side of the unreaped land H0 side in addition to the front, the work to solve or to prevent the abnormality can be performed easily.

According to the combine harvester 1 according to this embodiment, when the detecting portions 63 to 68 detect an abnormality or a sign of an abnormality in a part of the unreaped land H0 side of the main-body portion 12, the control portion 45 executes control such that the traveling portion 2 is caused to travel backward by the first predetermined distance D1 and to travel away from the unreaped land H0 to the side by the second predetermined distance D2. According to this configuration, since a space is provided also on the side of the unreaped land H0 side and the side of a side where the abnormality was detected in addition to the front, the work to solve the abnormality can be performed easily.

Moreover, according to the combine harvester 1 according to this embodiment, when the field information indicates that the left of the main-body portion 12 is the unreaped land H0 and the right is the reaped land H1, and when the detecting portions 63 to 68 detect an abnormality or a sign of an abnormality in the conveying device 16 or the threshing portion 4, the control portion 45 executes control such that the traveling portion 2 is caused to travel backward by the first predetermined distance D1 and also to travel away from the unreaped land H0 to the right side by the second predetermined distance D2. According to this configuration, since a space is provided also on the left in addition to the front, the work to solve or to prevent the abnormality in the conveying device 16 and the threshing portion 4 can be performed easily.

Moreover, according to the combine harvester 1 according to this embodiment, after the traveling portion 2 is caused to travel backward, when an abnormality or a sign of an abnormality is solved, and when an operation allowing resumption of the automatic reaping work is accepted by the terminal 30 and the like, the control portion 45 controls the traveling portion 2 and the main-body portion 12 so that the automatic reaping work is resumed after movement to the interrupted position where the automatic reaping work was interrupted. According to this configuration, a burden of the operation to resume the automatic reaping work can be reduced.

Moreover, according to the combine harvester 1 according to this embodiment, the control portion 45 controls the traveling portion 2 to move to the interrupted position at a speed slower than the set speed in the automatic reaping work. According to this configuration, the combine harvester 1 can be moved to the interrupted position while the user checks presence/absence of recurrence of the abnormality.

Moreover, according to the combine harvester 1 according to this embodiment, the control portion 45 executes control such that, after the automatic reaping work is interrupted, when the operation to allow the backward travel of the traveling portion 2 is accepted by the terminal 30 and the like, the traveling portion 2 is caused to travel backward. According to this configuration, the user is allowed to determine whether the combine harvester 1 should be moved backward. For example, if the user determines that there is no abnormality on the basis of a rule of thumb, the automatic reaping work can be resumed immediately. Alternatively, the backward travel can be stopped when an obstacle is found in the rear.

The embodiment described above may be modified as follows.

In addition to the above embodiments, such a function may be included that the combine harvester 1 is caused to travel backward when the user senses a sign of an abnormality. For example, a "Back Once" button is displayed on the terminal 30 during the automatic reaping work. If the user observes the conveying device 16 and the like and senses a sign of jamming of the grain culms, he/she operates the "Back Once" button. Then, the control portion 45 raises the reaping portion 3 and interrupts the automatic reaping work, causes the combine harvester 1 to travel backward by the first predetermined distance D1 and then, causes it to travel forward to the interrupted position at a speed slower than the traveling speed of the automatic reaping work, and lowers the reaping portion 3 and resumes the automatic reaping work. The first predetermined distance D1 is set at such a distance that a boundary between the unreaped land H0 and the reaped land H1 in front is visible. According to this configuration, if the user senses a sign of an abnormality, occurrence of the abnormality can be prevented.

In the above embodiment, the example is shown where the control portion 45 causes the combine harvester 1 to move to the rear at Step S14 in FIG. 6, but it may be so configured that the combine harvester 1 is caused to move to the rear right at the same Step. In this case, Steps S12 and S14 may be omitted.

In the above embodiment, the example is shown where the control portion 45 causes the combine harvester 1 to move to the rear at Step S24 in FIG. 6, but it may be so configured that the combine harvester 1 is caused to move to the rear left at the same Step. In this case, Steps S22 and S24 may be omitted.

Moreover, at Step S24, it may be so configured that the combine harvester 1 is caused to move to the rear left only if the operator is onboard the combine harvester 1. That is because, even if an abnormality is not detected on the unreaped land H0 side (right side), it is better to have a space for the operator to get off the vehicle so that he/she can quickly and safely move to the work to solve the abnormality. Specifically, a sensor (not shown) for detecting an operator is provided in the driver's seat 29, and when the operator is detected, the control portion 45 executes control such that the traveling portion 2 is caused to travel backward by the first predetermined distance D1 and to travel away from the unreaped land H0 to the left by the second predetermined distance D2. Since it is only necessary to ensure a space for getting off the vehicle on the unreaped land H0 side, the moving distance (1 m, for example) to the left may be smaller than the second predetermined distance D2 (2 m in the above embodiment).

DESCRIPTION OF REFERENCE NUMERALS

1 Combine harvester
2 Traveling portion
3 Reaping portion
4 Threshing portion
12 Main-body portion
16 Conveying device
30 Terminal (Operation portion)
45 Control portion
62, 63, 64, 65, 66, 67, 68 Detecting portion
D1 First predetermined distance
D2 Second predetermined distance

The invention claimed is:

1. A combine harvester, comprising:
a main-body portion including a reaping portion configured to reap grain culms;
a traveling portion configured to travel while supporting the main-body portion;
a detecting portion configured to detect a malfunction of a component of the main-body portion;
an operation portion configured to accept operations; and
a control portion configured to execute control such that,
based on detection, by the detecting portion, of the malfunction during performance of an automatic reaping work in which the reaping portion is caused to reap the grain culms while the traveling portion is caused to travel autonomously, after the automatic reaping work is interrupted, the traveling portion is caused to travel backward from an interrupted position by a first predetermined distance; and
after the traveling portion is caused to travel backward, when the malfunction detected by the detecting portion is solved and an operation which allows resumption of the automatic reaping work is accepted by the operation portion, after the traveling portion is caused to move to the interrupted position where the automatic reaping work was interrupted, the traveling portion and the main-body portion resume the automatic reaping work.

2. The combine harvester according to claim 1, wherein:
the detecting portion is configured to detect an indication of a potential for the malfunction to occur in the main-body portion in addition to the malfunction; and
based on detection, by the detecting portion, of the indication of the potential for the malfunction during performance of the automatic reaping work, after the automatic reaping work is interrupted, the control portion is configured to execute control such that the traveling portion is caused to travel backward by the first predetermined distance.

3. The combine harvester according to claim 2, further comprising:

a field-information acquiring portion configured to acquire field information including an outer shape of a field and an outer shape of an unreaped land or a reaped land in the field, wherein when the field information indicates that either one of left and right of the main-body portion is the unreaped land and the other side is the reaped land, and when the detecting portion detects the malfunction or the indication of the potential for the malfunction during performance of the automatic reaping work, the control portion is configured to execute control such that the traveling portion is caused to travel backward by the first predetermined distance and to travel away from the unreaped land to a side by a second predetermined distance.

4. The combine harvester according to claim 3, wherein, based on detection, by the detecting portion, of the malfunction or the indication of the potential for the malfunction in a part of the unreaped land side of the main-body portion, the control portion is configured to execute control such that the traveling portion is caused to travel backward by the first predetermined distance and to travel away from the unreaped land to a side by the second predetermined distance.

5. The combine harvester according to claim 4, further comprising, on the left of the main-body portion:

a conveying device configured to convey the grain culms reaped by the reaping portion; and a threshing portion configured to thresh the grain culms conveyed by the conveying device, wherein when the field information indicates that the left of the main-body portion is the unreaped land and the right side is the reaped land, and when the detecting portion detects the malfunction or the indication of the potential for the malfunction in the conveying device or the threshing portion, the control portion is configured to execute control such that the traveling portion is caused to travel backward by the first predetermined distance and to travel away from the unreaped land to the right by the second predetermined distance.

6. The combine harvester according to claim 1, wherein the control portion is configured to execute control such that the traveling portion is caused to move to the interrupted position at a speed slower than a set speed in the automatic reaping work.

7. The combine harvester according to claim 1, wherein the control portion is configured to execute control such that, after the automatic reaping work is interrupted, when the operation which allows the traveling portion to travel backward is accepted by the operation portion, the traveling portion is caused to travel backward.

8. A traveling control method, comprising:

an automatic reaping process in which a reaping portion is caused to perform an automatic reaping work for reaping grain culms, while a traveling portion is caused to travel autonomously, while supporting a main-body portion including the reaping portion;

a backward control process in which, when a detecting portion detects a malfunction of a component of the main-body portion during performance of the automatic reaping work, after the automatic reaping work is interrupted, the traveling portion is controlled to travel backward from an interrupted position by a first predetermined distance; and an automatic-reaping resumption process in which, after the traveling portion is caused to travel backward in the backward control process, when the malfunction detected by the detecting portion is solved and an operation which allows the automatic reaping work to be resumed is accepted by an operation portion, after the traveling portion is caused to move to the interrupted position where the automatic reaping work was interrupted, the traveling portion and the main-body portion are controlled to resume the automatic reaping work.

9. The traveling control method according to claim 8, wherein in the backward control process, such control is executed that, when the detecting portion detects an indication of a potential for the malfunction to occur in the main-body portion during performance of the automatic reaping work, after the automatic reaping work is interrupted, the traveling portion is caused to travel backward by the first predetermined distance.

10. The traveling control method according to claim 9, wherein in the backward control process, such control is executed that, when field information indicates that either one of left and right of the main-body portion is the unreaped land and the other is the reaped land, and when the detecting portion detects the malfunction or the indication of a potential for the malfunction to occur during performance of the automatic reaping work, the traveling portion is caused to travel backward by the first predetermined distance and to travel away from the unreaped land to a side by a second predetermined distance.

11. The traveling control method according to claim 10, wherein in the backward control process, such control is executed that, when the detecting portion detects the malfunction or the indication of the potential for the malfunction to occur in a part of the unreaped land side of the main-body portion, the traveling portion is caused to travel backward by the first predetermined distance and to travel away from the unreaped land to a side by the second predetermined distance.

12. The traveling control method according to claim 11, wherein in the backward control process, when the field information indicates that left of the main-body portion is the unreaped land and the right of the main-body portion is the reaped land, and when the detecting portion detects the malfunction or the indication of the potential for the malfunction to occur in a conveying device which is provided on a left side of the main-body portion and conveys the grain culms reaped by the reaping portion or a threshing portion which is provided on the left side of the main-body portion and threshes the grain culms conveyed by the conveying device, the traveling portion is caused to travel backward by the first predetermined distance and to travel away from the unreaped land to the right by the second predetermined distance.

13. The traveling control method according to claim 8, wherein:

in the automatic-reaping resumption process, the traveling portion is controlled to move to the interrupted position at a speed slower than a set speed in the automatic reaping work.

14. The traveling control method according to claim 8, wherein:

in the backward control process, after the automatic reaping work is interrupted, when the operation which allows the traveling portion to travel backward is accepted by the operation portion, the traveling portion is controlled to travel backward.

15. A combine harvester, comprising:

a main-body portion including a reaping portion configured to reap grain culms;

a traveling portion configured to travel while supporting the main-body portion;

a detecting portion configured to detect a malfunction of a component of the main-body portion;

a field-information acquiring portion configured to acquire field information including an outer shape of a field and an outer shape of an unreaped land or a reaped land in the field; and a control portion configured to execute control such that, based on detection, by the detecting portion, of the malfunction during performance of an automatic reaping work in which the reaping portion is caused to reap the grain culms while the traveling portion is caused to travel autonomously, after the automatic reaping work is interrupted, the traveling portion is caused to travel backward by a first predetermined distance;

wherein when the field information indicates that either one of left and right of the main-body portion is the unreaped land and the other side is the reaped land, and when the detecting portion detects the malfunction during performance of the automatic reaping work, the control portion is configured to execute control such that the traveling portion is caused to travel backward by the first predetermined distance and to travel away from the unreaped land to a side by a second predetermined distance.

* * * * *